United States Patent [19]
Crawford

[11] 3,964,124
[45] June 22, 1976

[54] SEALED CASTER
[75] Inventor: Thomas A. Crawford, Jackson, Mich.
[73] Assignee: Midwest-Precision Corporation, Jackson, Mich.
[22] Filed: Dec. 30, 1974
[21] Appl. No.: 537,101

[52] U.S. Cl. ............................ 16/21; 16/18 CG
[51] Int. Cl.$^2$ .................................. B60B 33/00
[58] Field of Search ............ 16/18 CG, 21, 46, 18 R

[56] References Cited
UNITED STATES PATENTS

| | | | |
|---|---|---|---|
| 1,432,966 | 10/1922 | Chesnutt | 16/18 CG |
| 2,034,948 | 3/1936 | Knapp | 16/18 CG |
| 2,523,659 | 9/1950 | Heffernan | 16/18 CG |
| 2,787,804 | 4/1957 | Noelting et al. | 16/21 |
| 2,908,536 | 10/1959 | Dickey | 16/18 CG |
| 3,399,421 | 9/1968 | Crawford | 16/18 CG |
| 3,479,680 | 11/1969 | Clinton et al. | 16/21 |

*Primary Examiner*—Andrew V. Kundrat
*Attorney, Agent, or Firm*—Beaman & Beaman

[57] ABSTRACT

A caster utilizing mounting structure, leg structure rotatably mounted on the mounting structure, and a wheel rotatably mounted upon the legs wherein the relatively movable parts of the caster are sealed against the entrance of foreign matter by means of a resilient synthetic material cover. In the method of constructing a caster in accord with the invention components thereof are coated with the coating material, such as by dipping, and the coating material, after curing, is severed at the desired locations to form sealing edges between relatively movable components. In a preferred method of forming the caster, mandrels having a configuration similar to the final caster components may be employed, however, it is within the scope of the invention to use the caster components themselves for molding purposes wherein the sealing material is later severed at the desired locations. The resultant sealed caster, while not watertight, is effective to prevent most foreign matter from entering the relatively moving components of the caster such as the swivel bearing and axle.

9 Claims, 8 Drawing Figures

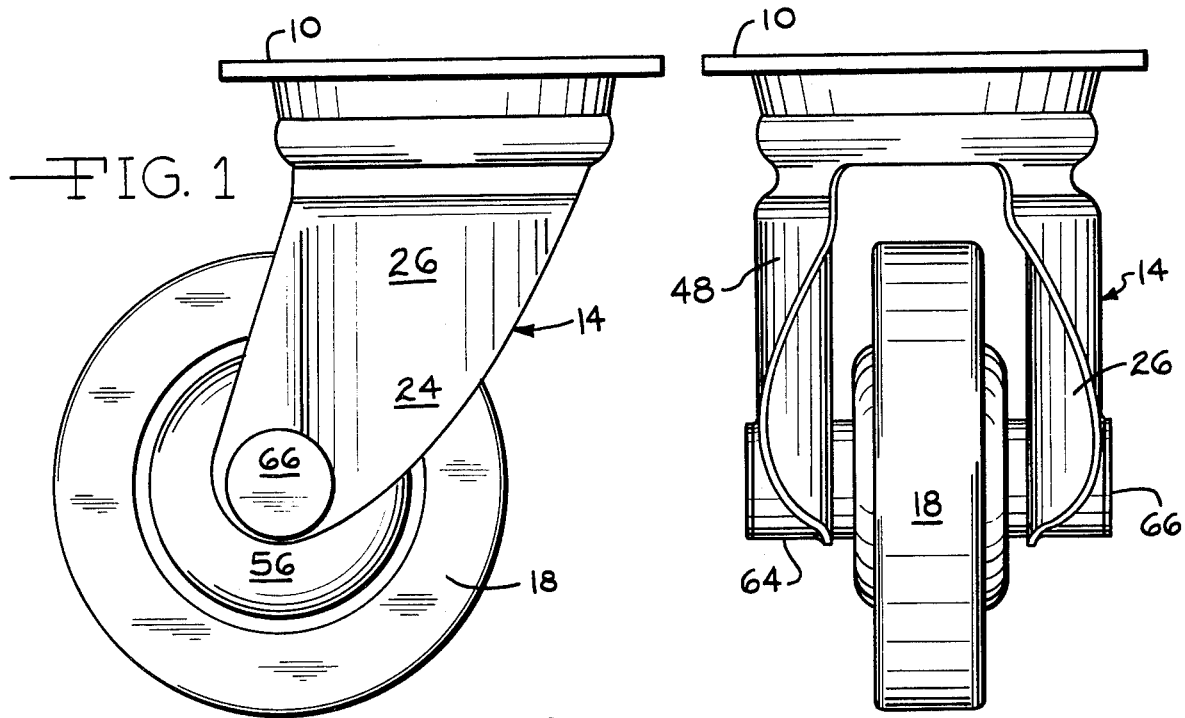
FIG. 1
FIG. 2
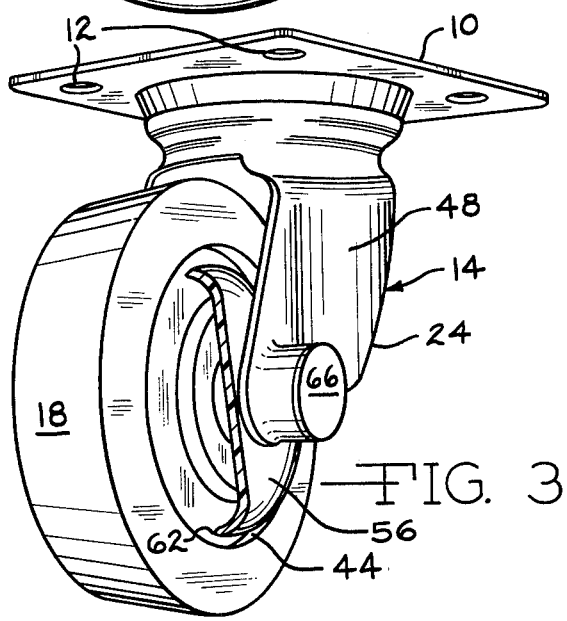
FIG. 3
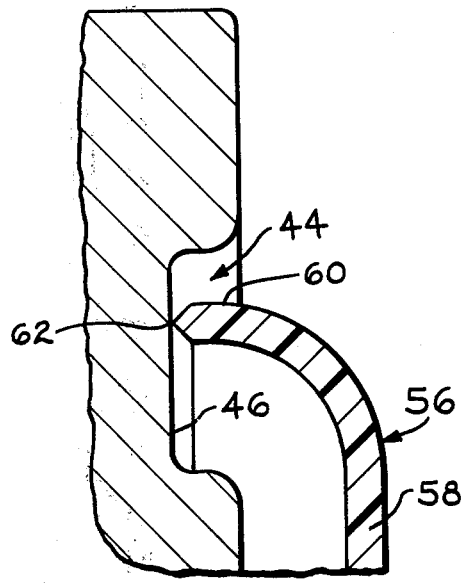
FIG. 4
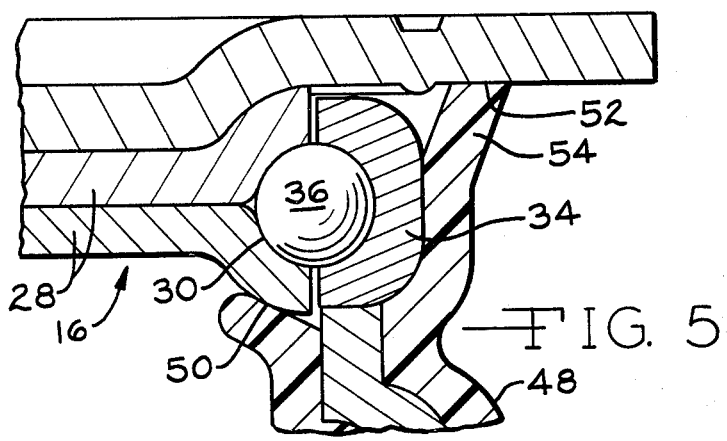
FIG. 5

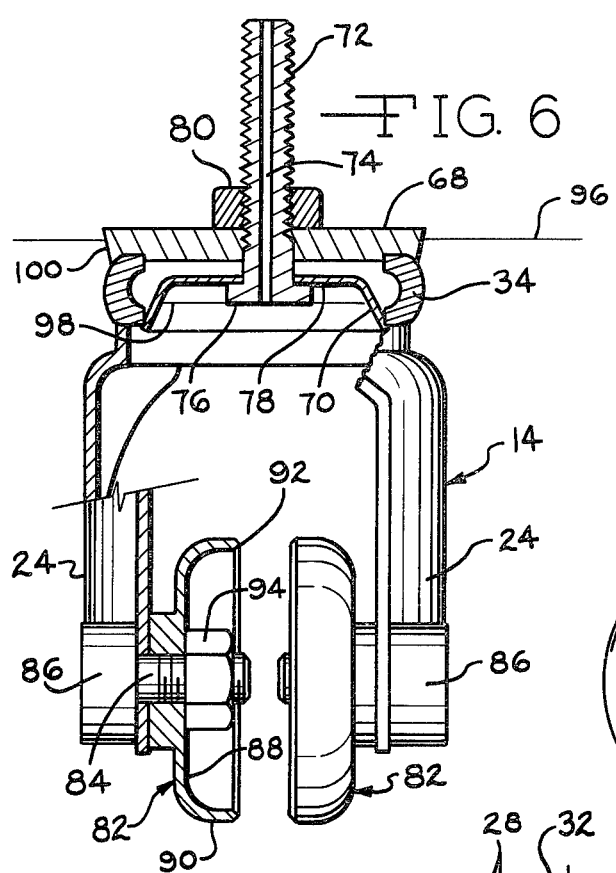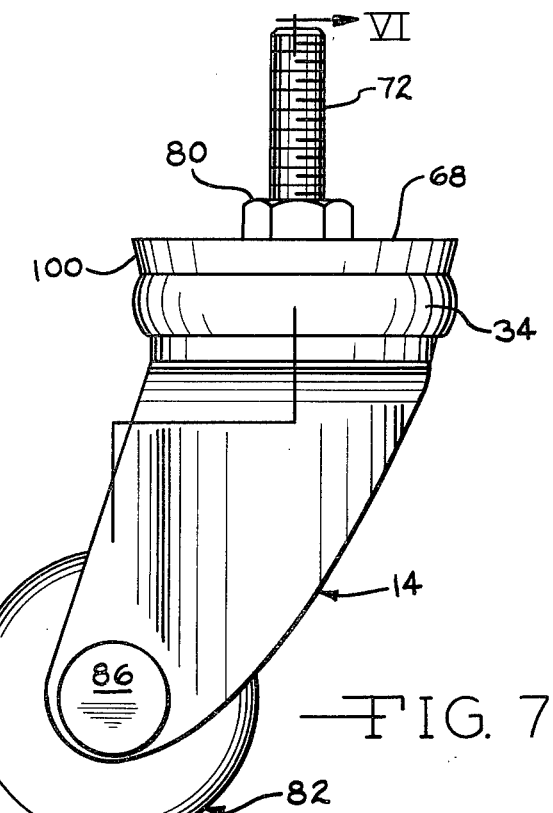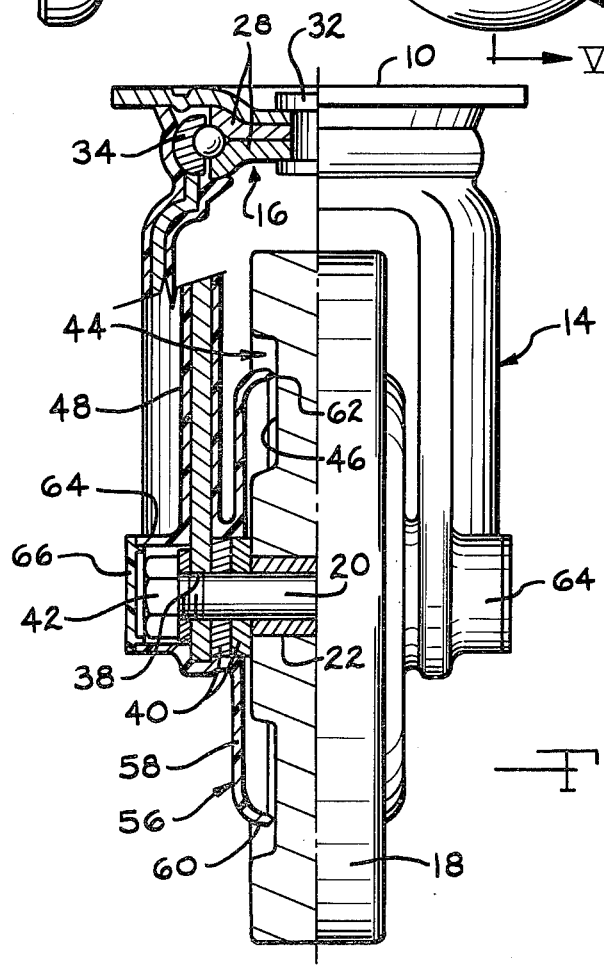

SEALED CASTER

BACKGROUND OF THE INVENTION

The invention pertains to the method of forming a sealed caster and a sealed caster, per se, wherein resilient cover means are employed to seal relatively rotatable components from the entrance of foreign matter.

Caster wheels are utilized in a wide variety of applications wherein it is desired to mount structures upon wheels. Such casters are normally classified as fixed or nonswiveling types, or swiveling casters wherein the wheel-supporting leg structure is capable of rotation about a substantially vertical axis and the wheel axis is offset from the vertical axis wherein the caster automatically assumes a "trailing" relationship to the vertical swivel axis during motion.

It is not uncommon for apparatus supported upon casters to be utilized in a wide variety of ambient atmospheres and in many applications it is not uncommon for the atmosphere to which the caster is subjected to corrosively effect the caster bearing components, such as by water, heat, acids, vapors, and the like, and in those applications wherein the dust or dirt, or small particle content is high, such small particles of foreign matter often enter the caster bearings and movable parts, adhere to lubricating oils and greases, and accelerate the wear of the caster bearings and relatively moving components.

Casters have been produced of relatively noncorrodible materials, such as stainless steel, but such casters are very expensive and are usuable only in specialized locations wherein the cost is not a significant factor. Also, various types of casting and sealing means have been employed to minimize the entrance of foreign matter into caster bearing structure but such devices, in the past, have been expensive, relatively ineffective, and difficulty has been encountered in sealing the caster wheel axle structure effectively.

Also, in some applications, for instance in food service and hospital use, the ability of the caster to be cleaned and maintained in a hygienic condition is important, and previous caster constructions have created problems in this area in that their design resulted in a configuration difficult to clean and keep free of food particles.

Various attempts have been made to seal caster structure against foreign matter for purposes of improving the sanitation aspect, as well as improving bearing life, and my U.S. Pat. No. 3,399,421 discloses a "slip on" seal for casters toward this end.

Also, in many food handling applications, parts cleaning, and the like, casters are subjected to large amounts of water and moisture and unless the caster is constructed of relatively uncorrodible materials caster replacement on such devices is very high and maintenance costs excessive.

SUMMARY OF THE INVENTION

It is an object of the invention to provide a method of sealing a caster which is economical, effective, and results in an attractive caster which may be easily maintained in a hygienic condition.

A further object of the invention is to provide a method of sealing a caster wherein a pliable, resilient, synthetic coating encompasses the movable caster elements, except the wheel outer periphery, and the coating is formed with peripheral edges sealingly engaging the caster support plate and wheel minimizing the opportunity for foreign matter, water and moisture to enter into the caster bearings.

The caster in accord with the invention utilizes support structure, such as a support plate, to be mounted to the underside of the structure mounted upon the casters. The caster wheel is rotatably mounted upon a bifurcated leg element rotatably mounted to the support plate by bearings and the leg elements are coated with a synthetic plastic coating material, such as by a dipping process.

The leg elements also include a pair of oppositely disposed annular skirt portions of the coating material which are of a flexible configuration having peripheral edges which engage the caster wheel. The peripheral edges of the coating material function as a seal between the coating material and the wheel to prevent the entry of foreign matter into the caster wheel bearings. In a somewhat similar manner, the upper portion of the caster support structure engages the support plate at a peripheral edge concentric with the vertical axis of caster leg rotation and, thus, a sealed relationship between the support plate and the leg elements is achieved throughout 360° rotation of the leg elements and wheel axis relative to the support plate.

Access openings are defined in the coating material concentric with the wheel axis whereby the wheel mounting axle nuts are accessible and bearing structure in the wheel may be replaced, if necessary, without destroying the sealed relationship of the caster coating with the wheel.

BRIEF DESCRIPTION OF THE DRAWINGS

The aforementioned objects and advantages of the invention will be appreciated from the following description and accompanying drawings wherein:

FIG. 1 is a side elevational view of a swivel caster in accord with the inventive concepts, FIG. 2 is an elevational end view taken from the right of FIG. 1, FIG. 3 is a perspective view of the caster with the visible coating skirt shown in section to illustrate the relationship thereof with the wheel, FIG. 4 is an enlarged detail sectional view illustrating the engagement of the coating skirt with the wheel, FIG. 5 is an enlarged detail sectional view of the upper caster bearing structure illustrating the relationship between the coating material and the support plate and bearing structure, FIG. 6 is an elevational view, partially in section, as taken along section VI—VI of FIG. 7, illustrating the mandrels utilized in forming the coating material on the caster leg portion, FIG. 7 is an elevational side view of the apparatus of FIG. 6, and FIG. 8 is an elevational end view, such as taken from the left of FIG. 1, of a coated caster, the left side of the view being shown in section, while the right side thereof is shown in elevation.

DESCRIPTION OF THE PREFERRED EMBODIMENT

The components of a caster construction in accord with the inventive concept will be best appreciated from FIGS. 1 through 5 and 8. It is to be appreciated that the concepts in accord with the invention are not limited to the particular described and disclosed embodiment of caster, but the concepts thereof may be utilized with a wide variety of casters utilizing support members, legs or fork elements and wheels supported upon the legs. For instance, while the disclosed caster utilizes a flat support plate for mounting purposes, it is also common to mount casters upon stems and the sealing relationship disclosed may be employed with known caster structure variations.

The illustrated caster is of the swivel type and utilizes a relatively flat support plate 10, having mounting holes 12 formed therein, FIG. 3, whereby the support plate may be attached to the underside of the structure, not shown, to be supported upon the caster. The swivel caster shown includes a body including bifurcated leg portion 14 defining a fork rotatably mounted to the support plate 10 by an upper swivel bearing 16 normally installed such that the axis of the bearing 16 is vertically oriented. The lower portion of the leg portion 14 supports the wheel 18 which is located between the leg portions upon an axle 20. The wheel 18 is mounted upon the axle upon bearing structure indicated at 22, and may include sleeve-type bearings, or could include antifriction bearings, such as of the ball or roller type. As is well known, the axle 20 is offset with respect to the axle of bearing 16 such that during movement the axle 20 trails the axis of bearing 16 permitting the caster to orient itself in the direction of movement of the vehicle it is supporting.

In the disclosed embodiment, the legs 24 defined on leg portions 14 are provided with an outwardly curved portion 26 adjacent the forward portion of the legs, as apparent in FIG. 2, and the legs 24 extend in an inclined rearward direction, as will be appreciated from FIG. 1.

The upper bearing 16 includes an inner race formed by a pair of plates 28 attached to plate 10 by rivet 32 and separated at their outer peripheral edge to form the inner semi-spherical ball race 30, FIG. 5. The annular outer ball race 34 is welded to the upper end of the leg portion 14 and includes an inner race whereby the ball bearings 36 may be interposed between the race 30 and race 34 to rotatably support the leg portion 14 upon the support plate 10 for rotation about the vertical axis of the bearing 16.

The wheel axle 20 extends through holes 38, FIG. 8, defined in the lower end of the legs 24 and the wheel 18 rotates upon the axle upon bearing 22. Spacers 40 locate the wheel 18 between the legs 24, and nuts 42 threaded upon the end of the axle maintain the axle in position. As appreciated in the drawings, the wheel 18 is formed with an annular recess 44 on each side thereof, and the recess is defined by the annular radially extending surface 46.

The caster structure is sealed by a synthetic, resilient and pliable coating material 48. This coating material may be a vinyl resin in a liquid plasticizer such as plastisol, for instance, and is of such chemical characteristics as to be resistant to most atmospheric gases and chemicals, and capable of maintaining its resiliency over a long period of time. The leg portion 14 is completely covered by the material 48, and the upper portion of the coating material includes an annular inner edge 50 which extends inwardly toward the center of bearing 16, and an annular outer edge 52 which is formed on the outwardly free portion 54 of the coating 48. The inner edge 50 resiliently engages the lower inner bearing plate 28 forming a sealed relationship thereto. The edge 52 engages the underside of plate 10 forming a seal therewith and the length of portion 54 is such that the edge 52 is slightly biased against the plate. Thus, as the leg portion 14 rotates relative to the support plate 10 about the vertical axis of the bearing 16, engagement of the edges 50 and 52 with their associated support member surfaces maintains a seal which protects the bearing 16 from the entrance of foreign matter.

At the lower portion of the legs 24 the coating material 48 is so formed as to define an annular skirt or bell 56 on each leg portion disposed toward the wheel 18. The skirts 56, FIG. 8, each include a flexible radial portion 58, and an axial portion 60 terminating at the edge 62 which engages the wheel recess surface 46. Preferably, the peripheral edges 62 of the skirts are formed with a sharply defined sealing edge for effectively engaging the wheel surface 46 to prevent the entrance of foreign matter into the wheel bearing structure disposed on the axle and the length of portions 60 are sufficient to create a bearing deformation in portions 58 to resiliently maintain edges 62 in engagement with the wheel. Thus, the wheel bearing structure is completely sealed against the entrance of foreign matter.

The coating material 48 concentric to the axle 20, on its outerside of the legs 24, is formed outwardly to define an open-ended boss 64 which is sealed by a circular plastic cap 66 inserted into the boss opening. The bosses 64 are large enough to accommodate a socket wrench to permit the nuts 42 to be rotated upon removal of the caps. Thus, it will be appreciated that it is possible to replace the axle 20 and wheel 18 without destroying the coating material skirts 56 in the event a new caster wheel, or wheel bearing, is required.

The synthetic covering on the leg portion 14, forming the skirts 56 and covering bearing 16, FIG. 5, is preferably of an attractive color of the purchaser's choice. As the synthetic coating 48 smoothly blends into the configuration of the caster, closely conforming to the shape of the major components, yet "softening" the right angle intersections thereof, such as between the nut and nut washers and the leg portions, the resultant appearance of the coated sealed caster of the invention is most attractive. By using attractive coatings of bright colors the caster contributes to the aesthetic characteristics of the vehicle so supported thereby, which is a departure from conventional caster constructions wherein the caster normally plays an insignificant part in the aesthetic appearance of the supported article, or detracts from the appearance.

As the relationship between the edges 50 and 52 and the bearing 16 and support plate 10 are effectively maintained at any angular position of rotation of the leg portion 14, and, likewise, the seal between the skirts 56 and the wheel 18 will be maintained as the wheel rotates, the relatively moving components of the caster are sealed against foreign matter and the sealed caster construction of the invention provides extended caster life as well as rendering the caster hygienic, easily cleanable and attractive in appearance.

FIGS. 6 and 7 illustrate one type of mandrel apparatus which may be used to coat the leg portion 14 with the synthetic plastic coating 48. For this purpose a circular plate 68 is placed upon the upper portion of the leg portion race 34, and an annular inverted dish-shaped plate 70 engages the inner lower edge of the race 34 and includes a threaded stem 72 which extends upwardly through the plate 68. The stem 72 is provided with a vent passage 74, and includes a head 76 which extends downwardly from the plate portion 78. A nut 80 maintains the assembly of plates 68 and 70 on race 34.

Skirt forming mandrels 82 are mounted upon the lower ends of the legs 24 by a bolt 84 having a head 86 which forms the annular boss 64. The skirt mandrels 82 are of an annular cupshaped configuration having a radial portion 88 and an axially extending portion 90 terminating in the edge 92. A pair of the mandrels 82 are mounted upon the leg portion 14 by bolts 84 and associated nuts 94 as shown in FIGS. 6 and 7.

The assembly of FIGS. 6 and 7 is immersed by dipping into the material 48 forming the coating. For instance, if the coating material is a plastisol, the assembly is heated and immersed in liquid plastisol to the line 96, FIG. 6, representing the surface of the liquid plastisol. The heated assembly causes a layer of plastisol to solidify on the assembly. During such immersion, the vent 74 permits the plastisol to enter the inverted cup-shaped plate 70 to the line 98, and once the plastisol reaches the line 98 the trapped air between the line and the plate portion 78 prevents the plastisol from rising higher. As the periphery 100 of plate 68 is conical the outward free portion 54 is formed adjacent line 96. After the assembly has been dipped to the depth indicated in FIG. 6, it is removed from the plastisol, the excess plastisol drips therefrom and the plastisol is permitted to cure, usually in the presence of heat.

After the plastisol has cured the plates 68 and 70 are removed from the upper portion of the leg portion by removal of nut 80, and prior thereto, if desired, the plastisol may be severed at the periphery 100 of the plate 68 to form the edge 52, although with careful dipping the edge 52 will be self formed. The edge 50 usually need not be formed by severing with a knife as the limiting of the entrance of the plastisol into the plate 70 will form the desired edge 50.

Further, by the use of a knife, the plastisol covering is severed at the mandrel edges 92 and the plastisol is removed from the skirt mandrel 82 to expose the nuts 94. Also, the plastisol coating is severed in an annular manner about the bolt heads 86 to form the opening of bosses 64. Once the mandrel components have been so severed, the nuts 94 are loosened from the bolts 84 and the bolts pulled from the leg axle holes 38 and the mandrels removed from the legs. At this time, it will be appreciated that the plastisol material 48 remaining on the leg portion 14 is of a configuration as apparent in FIG. 8 and, at this time, the support plate 10 and bearing structure 16 may be assembled to the upper portion and the wheel, and axle structure assembled to the lower portion of the leg portion to produce the finished caster assembly.

While the desired method for forming the coating configuration is that described above with respect to FIGS. 6 and 7, it is within the scope of the invention that the coating could be accomplished by dipping a completely assembled caster, such as shown in FIGS. 1 through 5 and 8, into liquid plastisol, or the like, and permitting curing without utilizing mandrels or other coating assemblies, such as shown in FIGS. 6 and 7. By utilizing a high viscosity plastisol the liquid plastisol will not enter into the bearing structure to adversely affect the same and the edges 50, 52 and 62 can be formed by severing with a sharp knife for removing the unwanted portions of the coating from the upper bearing and support plate structure. When utilizing such a coating method, it would be necessary to sever the coating adjacent the wheel and remove the coating from the peripheral portions of the wheel. Such severing would most advantageously take place on the wheel recess surface 46, and while such a method of coating would not result in a "free" skirt portion 58, which aids in the maintaining of a resilient seal between the skirt and the edge 62, an effective sealing relationship between the coating and the wheel would still be produced. Of course, it will be appreciated that the coating material does not adhere to the wheel or the support plate components sufficiently to prevent relative rotation between the coating and these components and such is not the case with conventional coating plastisols.

It is appreciated that various modifications to the inventive concepts may be apparent to those skilled in the art without departing from the spirit and scope of the invention.

I claim:

1. A sealed caster comprising, in combination, a body, support means for attaching said body to the caster supported apparatus, said body including a pair of spaced legs, an axle supported on said legs extending therebetween, a wheel mounted intermediate said legs rotatably supported upon said axle and having opposite sides, a resilient seal coating mounted upon each of said legs adjacent said axle, said seal coating on each leg defining an annular flexible skirt portion extending toward said wheel having a peripheral edge engaging a side of said wheel to seal said axle adjacent said wheel.

2. In a sealed caster as in claim 1 wherein said skirt portions peripheral edges are substantially circular and are concentric to said axle.

3. In a sealed caster as in claim 2, said wheel having solid opposed sides each including a circular, annular recess concentric with said axis, said peripheral edges each engaging a wheel side within its associated recess.

4. In a sealed caster as in claim 1 wherein said resilient seal coating comprises a coating of synthetic material completely covering and adhering to said body.

5. In a sealed caster as in claim 4, nuts mounting said axle upon said legs, nut access openings defined in said coating material in alignment with said nuts, and removable cover means sealing said access openings.

6. In a sealed caster as in claim 4, an upper seal edge defined on said coating material adjacent said support means sealing said caster body with respect to said support means.

7. A sealed swivel caster comprising, in combination, a support plate, a body, bearing means rotatably mounting said body upon said support plate for rotation about a swivel axis, said body including a pair of spaced legs, an axle supported on said legs extending therebetween transversely disposed to such swivel axis, a wheel mounted intermediate said legs rotatably supported upon said axle having opposite sides, a resilient seal coating mounted upon said legs encompassing said legs adjacent said axle, said seal coating including skirt portions defined upon each leg extending toward said wheel and each having a peripheral edge engaging a side of said wheel, said peripheral edges sealingly engaging said wheel to seal said axle, and sealing means interposed between said body and said support plate sealing said body and bearing means with respect to said support plate.

8. In a sealed swivel caster as in claim 7 wherein said sealing means interposed between said body and said support plate comprises an annular lip defined by said seal coating having an annular edge, said edge slidably engaging said support plate.

9. In a sealed swivel caster as in claim 8, said bearing means including an inner race fixed to said support plate, and a second annular lip defined on said seal coating sealingly engaging said inner race.

* * * * *